United States Patent Office 2,846,433
Patented Aug. 5, 1958

2,846,433

SUBSTITUTED PYRIDAZINES

Charles J. Pennino, Hudson, Ohio, assignor to The B. F. Goodrich Company, New York, N. Y., a corporation of New York No Drawing. Application September 20, 1955
Serial No. 535,519

11 Claims. (Cl. 260—250)

This invention relates to tri- and tetrahalopyridazines and more particularly pertains to 3,4,6-trihalo- and 3,4,5,6-tetrahalopyridazines having the generic formula

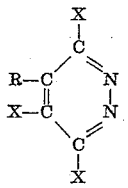

in which X represents a halogen having an atomic weight from about 35 to about 80 and R represents hydrogen or a halogen having an atomic weight from about 35 to about 80. The invention also relates to methods for preparing the halogenated pyridazines.

The tetrahalopyridazines are excellent pre- and post-emergent herbicides, they are effective insecticidal agents against house flies, Mexican bean beetles and two spotted mites, and they also possess exceptional fungicidal and bactericidal properties.

The trihalopyridazines are excellent herbicides and insecticides, but are less effective bactericidally against *S. aureus* than the tetrahalopyridazines.

An object of the invention is the provision of a 3,4,6-trihalo- and 3,4,5,6-tetrahalopyridazines.

Another object is the provision of 3,4,6-trichloro- and 3,4,5,6-tetrachloropyridazines.

Still another object is a method for the preparation of the trihalo- and tetrahalopyridazine from a halomaleic anhydride, hydrazine and a halogenating agent.

Numerous other objects will be apparent from the following detailed disclosure which describes a preferred embodiment of the invention.

The above objects are accomplished by first preparing 4-halo- or 4,5-dihalopyridazine-3,6-diones from mono-halomaleic anhydride or dihalomaleic anhydride, respectively, by reacting the appropriate halogenated anhydride with hydrazine and thereafter further reacting the halogen containing pyridazine dione with a halogenating agent. Alternately, the halogen containing pyridazine dione can be employed as a starting material which can be converted to the desired end product by a halogenating agent, particularly a phosphorous oxytrihalide and in the presence of phosphorous trihalide.

The reaction can be graphically described by the following reaction formula:

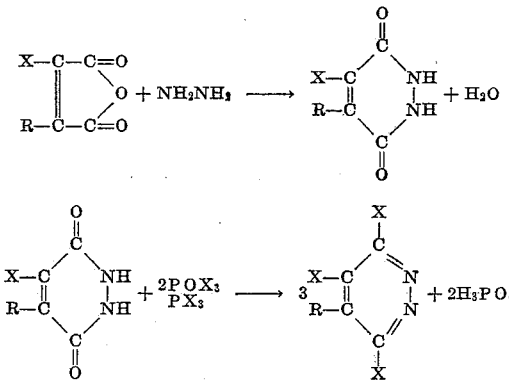

In the above formulas, X and R have the same designation as hereinbefore indicated.

The reaction is preferably carried out at an elevated temperature, usually under reflux and at atmospheric pressure. It is evident, however, that higher temperatures under super-atmospheric pressure are also applicable.

An excess of the halogenating agent is preferably employed to shift the equilibrium towards completion of the reaction.

It is not essential to use a solvent or diluent in the reaction system, but if one is used it should be non-reactive with maleic anhydride or hydrazine to prepare the pyridazine-dione and, if a diluent is employed for the halogenation step, it should be a liquid which is not readily halogenated, such as chloroform, carbon tetrachloride or tetrachloroethylene, and which will not hydrolyze the phosphorous halide if the latter is employed for halogenation.

The following examples are intended for illustrative purposes and are not to be construed as limitations on the invention. In the examples all parts are by weight unless otherwise indicated.

*Example 1*

A chlorine containing 1,2-dihydropyridazine-3,6-dione was prepared by adding 132.5 parts of monochloromaleic anhydride to an ethanol solution of 40 parts of 85% purity hydrazine hydrate. The reaction mixture evolved considerable heat. When the spontaneous reaction subsided heat was applied and the mixture was refluxed overnight with stirring. Then the mixture was cooled and filtered. The precipitate was washed with ethanol and dried. A 59% yield of crystals having a M. P. of 272–273° C. was recovered. On recrystallization from water the crystals had a M. P. of 273–275° C. This compound had the following structure:

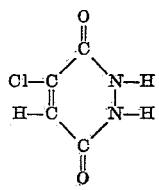

Example II

To 45 parts of the 1,2-dihydro-4-chloropyridazine-3,6-dione were added 250 ml. of POCl₃ and the mixture was refluxed overnight. The excess POCl₃ was removed by distillation at 60° C. under 20 mm. pressure. The residue was poured onto cracked ice and made alkaline with concentrated aqueous ammonium hydroxide. The 3,4,6-trichloropyridazine separated as a solid which was recovered by filtration. The crude crystals had a M. P. of 49–55° C. Forty-six parts of the crystals were purified by distillation at 79–81° C. under 0.3 mm. pressure to yield 39.5 parts, 72%, of crystals having M. P. of 57–59° C.

On analysis the following results were obtained:

|  | C | H |
|---|---|---|
| Calculated for $C_4HCl_3N_2$ | 26.15 | 0.54 |
| Found | 25.88 / 25.95 | 0.58 / 0.72 |

Example III

The 3,4,5,6-tetrachloropyridazine was prepared by reacting 50 parts of 1,2-dihydropyridazine-4,5-dichloro-3,6-dione with 300 ml. of POCl₃ as reflux temperature overnight. The excess POCl₃ was distilled from the reaction mixture at 60° C. under 20 mm. pressure. The residue was poured onto cracked ice and then made alkaline with concentrated aqueous ammonium hydroxide. A 66% yield of crude 3,4,5,6-tetrachloropyridazine was recovered by filtration of the alkaline mixture. On recrystallization from hot ethanol containing activated carbon, the purified crystals had a melting point of 85–86° C.

The purified material was analyzed and found to contain 22.34% carbon as compared to a theoretical value of 22.0 for

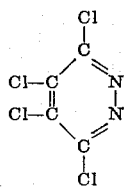

Both the halopyridazine diones and the tri- and tetrahalopyridazines can be prepared by alternative methods.

Thus, 4-chloro-1,2-dihydropyridazine-dione-3,6 and 4,5-dichloro-1,2-dihydropyridazine-dione-3,6 can be prepared by first making a solution of hydrazine hydrate in water, adding sufficient strong, water-soluble mineral acid, such as HCl, H₂SO₄, or H₃PO₄ to convert the hydrazine to the acid salt, and then adding at one time the requisite amount of monohalomaleic anhydride or dihalomaleic anhydride. The mixture is refluxed for about five hours with vigorous stirring. The corresponding halo-1,2-dihydropyridazine-dione-3,6 forms as a white solid in the aqueous medium. The solid can be easily separated from the aqueous material, washed and dried for subsequent halogenation to tri- and tetrahalopyridazines.

The conversion of the mono- and dihalo-1,2-dihydropyridazine-dione-3,6 compounds to tri- and tetrahalopyridazines can be effected by using a mixture of phosphorous oxyhalide and phosphorous trihalide or phosphorous pentahalide. As little as 10% by weight of phosphorous halide in admixture with the phosphorous oxyhalide results in improved yields of the desired end product.

Example IV

A reaction mixture of 45 parts of dry 4-chloro-1,2-dihydropyridazine-dione-3,6, 300 ml. of POCl₃ and 30 ml. or PCl₃ was refluxed for about 18 hours. The unreacted POCl₃ and PCl₃ were removed from the reaction mixture by vacuum distillation at a temperature not exceeding 60° C. The residue was poured over finely chopped ice, made alkaline with concentrated ammonium hydroxide and then filtered. The solid residue was air dried and distilled at 79–81° C. at 0.3 mm. pressure to yield 87% of a purified 3,4,6-trichloropyridazine having a M. P. of 57–59° C.

Example V 50 parts of dry 4,5-dichloro-1,2-dihydro-pyridazine-dione-3,6 were mixed with 400 ml. of POCl₃ and 40 ml. of PCl₃ and refluxed overnight (about 18 hours). As in Example IV the desired end product was separated from the cold ammoniacal mixture by filtration. The brownish solid when recrystallized from ethanol had a M. P. of 85–86° C.

Example VI

Halogenated pyridazines containing both chlorine and bromine can be prepared by reacting 1,2-dihydro-4,5-dichloropyridazine dione-3,6 with PBr₃. A mixture containing 18.1 parts of 1,2-dihydro-4,5-dichloropyridazine dione-3,6 and 50 ml. PBr₃ was refluxed for several hours. The reaction mixture was poured onto finely chopped ice and neutralized at 5–10° C. with ammonium hydroxide. A brown solid which formed was removed by filtration and recrystallized from ethanol containing a decolorizing carbon. The recrystallized compound did not have a sharp melting point, but upon heating the material at 100° C. and 0.5 mm. pressure sublimation of a portion of the product occurred. The sublimate had a melting point of 166–169° C. and a carbon and hydrogen content of 13.26% and .02% respectively which corresponds fairly well to the calculated value of carbon in $C_4Br_3ClN_2$.

The tri- and tetrabromopyridazines can readily be prepared from 1,2-dihydro-4-bromopyridazine-3,6-dione and 1,2-dihydro-4,5-dibromopyridazine-3,6-dione by reacting these latter compounds with POBr₃ in place of POCl₃. Tri- and tetrahalopyridazines containing both bromine and chlorine can be prepared by reacting a mono- or dibromopyridazine-3,6-dione with POCl₃ or by reacting a mono- or dichloropyridazine-3,6-dione with POBr₃.

Other halogenating agents include PCl₅, PCl₃ PBr₅ and PBr₃.

Fluorine atoms may be introduced into the tri- and tetrahalogenated pyridazines by treatment of the tribromo, trichloro, tetrabromo or tetrachloropyridazines with known fluorinating materials such as the antimony fluorides.

The unique biological properties of the tri- and tetrahalopyridazines become apparent when they are compared with compounds having closely related structures.

Thus, 3,4,5,6-tetrachloropyridazine at a concentration of 10 P. P. M. in water completely inhibits algal growth and spore germination of A. oleracea. A filter paper disc dipped in a 1% solution of the tetrachloropyridazine completely inhibited the growth of S. aureus and S. fructicola in nutrient agar on standard petri dishes incubated at 98° F. Kraft paper dipped in a 1% solution of the tetrachloropyridazine retained 100% of its strength after a soil burial test. At concentrations of 0.5% the compound is a pre-emergent herbicide in soil for oats, radishes, tomatoes and buck wheat, and if used as a spray it is a post-emergent herbicide for tomatoes, beans, oats and radishes. The insecticidal action mentioned heretofore was determined at a concentration of 1%.

The 3,4,6-trichloropyridazine parallels the tetrachloropyridazine in each of the properties enumerated above except its ability to control the growth of S. aureus. In this test the sterile zone extended for a distance of 2.5 cm. from the edge of the of the paper disc.

The compounds with which the halopyridazines of this invention were compared directly included

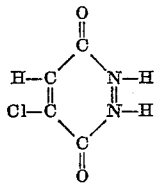

and its sodium salt, and

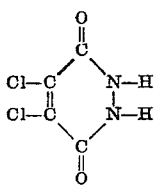

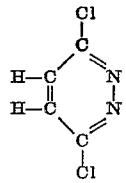

dichloromaleic anhydride and pentachlorophenol.

The compound with the structure

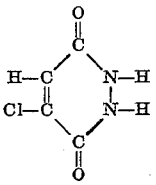

inhibited about 98% of the spores of *A. oleracea* at 100 P. P. M. but had no apparent effect on the growth of *S. aureus* or *S. fructicola*, in a 1% concentration. It did not completely inhibit algal growth at 10 P. P. M. It showed spotty pre-emergent herbicidal activity and practically no post-emergent herbicidal action. It did not protect cotton duck or kraft paper from deterioration in soil burial tests.

The 1,2-dihydro-4,5-dichloropyridazine-3,6-dione inhibited the spores of *A. oleracea*, showed slight bactericidal activity against *S. aureus* and *S. fructicola*, did not protect cotton duck from deterioration, but gave fair protection to kraft paper in soil burial tests, was a fair algicide, but showed substantially no herbicidal activity. The sodium salt of this compound, however, was quite poor in its microbiocidal and plant growth regulating action.

3,6-dichloropyridazine showed very little ability to control the growth of the spores of *A. oleracea*, no inhibition of the growth of the bacteria mentioned above, little protection to cotton duck and kraft paper, only slight algicidal activity and no herbicidal activity.

Dichloromaleic anhydride showed only slight bactericidal activity, did not protect cotton duck or kraft paper from decomposition, did not prevent growth of algea and was shown to be a poor pre- and post-emergent herbicide.

In these tests CuSO$_4$ solution was used as a reference standard for mold and algae growth inhibition, 5% phenol was the standard for *S. aureus* and *S. fructicola* control, 1% pentachlorophenol was the standard for the kraft paper and cotton duck deterioration tests.

The 3,4,5,6-tetrachloropyridazine at a 1% concentration in a mixture of 2 parts ethanol and 98 parts water gave 100% kill against houseflies, and 52% kill and 75% knockdown at a concentration of 0.1%. A 0.35% concentration kills 100% of Mexican bean beetles. A concentration as low as 0.05% is effective against adult two spotted mites and ova.

3,4,6-trichloropyridazine is highly effective against strawberry spider mite at concentrations of 1%.

From these data it is apparent that 3,4,6-trihalopyridazines and 3,4,5,6-tetrahalopyridazines are unique in their extremely broad spectrum of biological activity in that they are as effective or more effective than the reference standards mentioned, even though in a few instances the concentration of the tri- and tetrahalopyridazine was much lower than the reference standard against which the pyridazines were tested.

Although I have described my invention by specific examples, these are intended for illustrative purposes and that the only limitations in the invention are those recited in the appended claims.

I claim:

1. A composition having the structure

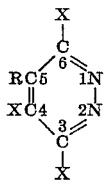

wherein R is selected from the class consisting of hydrogen and a halogen and X represents a halogen having an atomic weight of from 35 to 80.

2. 3,4,6-trichloropyridazine.
3. 3,4,5,6-tetrachloropyridazine.
4. 3,4,6-tribromopyridazine.
5. 3,4,5,6-tetrabromopyridazine.
6. 4,5-dichloro-3,6-dibromopyridazine.
7. The method of preparing compounds having the generic structure

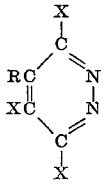

in which R is selected from the class consisting of hydrogen and halogen having an atomic weight of from 35 to 80 and X is a halogen having an atomic weight of from 35 to 80 comprising reacting a compound having the structure

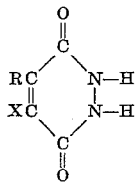

wherein R and X have the same designation as above with a mixture of compounds selected from the class consisting of a mixture of POX$_3$ and PX$_3$ in which the concentration of the PX$_3$ compound is at least 10% of the mixture, wherein X has the same designation as that above.

8. The method of claim 7 in which 4-chloro-1,2-dihydropyridazine-3,6-dione is reacted with a mixture of POCl$_3$ and PCl$_3$ in which the concentration of the PCl$_3$ is at least 10% by weight of the mixture.

9. The method of claim 7 in which 4,5-dichloro-1,2-dihydropyridazine-3,6-dione is reacted with a mixture of POCl$_3$ and PCl$^3$ in which the concentration of PCl$_3$ is at least 10% by weight of the mixture.

10. The method of claim 8 in which the halogenating agent is a mixture of POBr$_3$ and PBr$_3$ in which the concentration of $PBr_3$ is at least 10% by weight of the mixture.

11. The method of claim 9 in which the phosphorous halides are present as a mixture of $POBr_3$ and $PBr_3$ in which mixture the $PBr_3$ concentration is at least 10% by weight.

References Cited in the file of this patent
UNITED STATES PATENTS

| | | |
|---|---|---|
| 2,628,181 | Mowry | Feb. 10, 1953 |
| 2,671,086 | Rogers et al. | Mar. 2, 1954 |